US012574343B2

(12) United States Patent (10) Patent No.: US 12,574,343 B2
Aher et al. (45) Date of Patent: Mar. 10, 2026

(54) SYSTEMS AND METHODS FOR MULTI-AGENT CONVERSATIONS

(71) Applicant: Adeia Guides Inc., San Jose, CA (US)

(72) Inventors: Ankur Anil Aher, Maharashtra (IN); Jeffry Copps Robert Jose, Tamil Nadu (IN)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 17/399,867

(22) Filed: Aug. 11, 2021

(65) Prior Publication Data

US 2023/0053267 A1 Feb. 16, 2023

(51) Int. Cl.
| | |
|---|---|
| *H04L 51/043* | (2022.01) |
| *G10L 25/63* | (2013.01) |
| *H04L 12/18* | (2006.01) |
| *H04L 51/02* | (2022.01) |
| *H04L 67/306* | (2022.01) |
| *H04N 7/15* | (2006.01) |

(52) U.S. Cl.
CPC ............ *H04L 51/043* (2013.01); *G10L 25/63* (2013.01); *H04L 12/1831* (2013.01); *H04L 51/02* (2013.01); *H04L 67/306* (2013.01); *H04N 7/157* (2013.01)

(58) Field of Classification Search
CPC ............... H04L 51/043; H04L 12/1831; H04L 51/02; H04L 67/306; G10L 25/63; H04N 7/157
See application file for complete search history.

(56) References Cited

U.S. PATENT DOCUMENTS

| | | | |
|---|---|---|---|
| 10,237,209 | B2 | 3/2019 | Aggarwal et al. |
| 10,706,087 | B1 * | 7/2020 | Broomall ................ G06F 9/542 |
| 2014/0095397 | A1 * | 4/2014 | Phillips ............. G06Q 10/0639 |
| | | | 705/304 |
| 2017/0324867 | A1 * | 11/2017 | Tamblyn ............. H04L 65/1093 |
| 2017/0353404 | A1 * | 12/2017 | Hodge .................... H04L 51/04 |
| 2018/0233132 | A1 * | 8/2018 | Herold .................... G10L 17/04 |
| 2019/0012390 | A1 * | 1/2019 | Nishant ................. G06N 3/006 |
| 2019/0108316 | A1 * | 4/2019 | Anumalasetty ........ G16H 10/20 |
| 2020/0250277 | A1 * | 8/2020 | Mallette ................. G06F 40/35 |
| 2021/0064706 | A1 | 3/2021 | Mittal et al. |
| 2021/0174241 | A1 * | 6/2021 | Mishra .................. G06N 20/00 |

(Continued)

OTHER PUBLICATIONS

Chaves et al., "Single or Multiple Conversational Agents? An Interactional Coherence Comparison," 10.1145/3173574.3173765 (2018).

(Continued)

*Primary Examiner* — Nicholas R Taylor
*Assistant Examiner* — Tania M Pena-Santana
(74) *Attorney, Agent, or Firm* — HG LAW LLP

(57) ABSTRACT

A first input is received from a user input device. Based on the first input, a list of candidate intents is generated, and a plurality of agents is initialized. Each agent of the plurality of agents corresponds to a respective candidate intent. Each agent then provides a different response to the first input in accordance with its respective corresponding intent. A second input is then received that responds to one or more of the agents. Based on the agents to which the second input is responsive, the list of candidate intents is refined and, based on the refined list, one or more agents are deactivated.

16 Claims, 9 Drawing Sheets

(56) References Cited

U.S. PATENT DOCUMENTS

2022/0021630 A1 * 1/2022 Goyal .................... G06N 20/00

OTHER PUBLICATIONS

Lippert, Anne & Shubeck, Keith & Morgan, Brent & Hampton, Andrew & Graesser, Arthur, "Multiple Agent Designs in Conversational Intelligent Tutoring Systems," Technology, Knowledge and Learning, 25.10.1007/s10758-019-09431-8; pp. 1-34 (2020).
Smith et al., "Can You Put it All Together: Evaluating Conversational Agents' Ability to Blend Skills," arXiv:2004.08449v1 (2020).
Google Dialogflow (https://cloud.google.com/dialogflow).

* cited by examiner

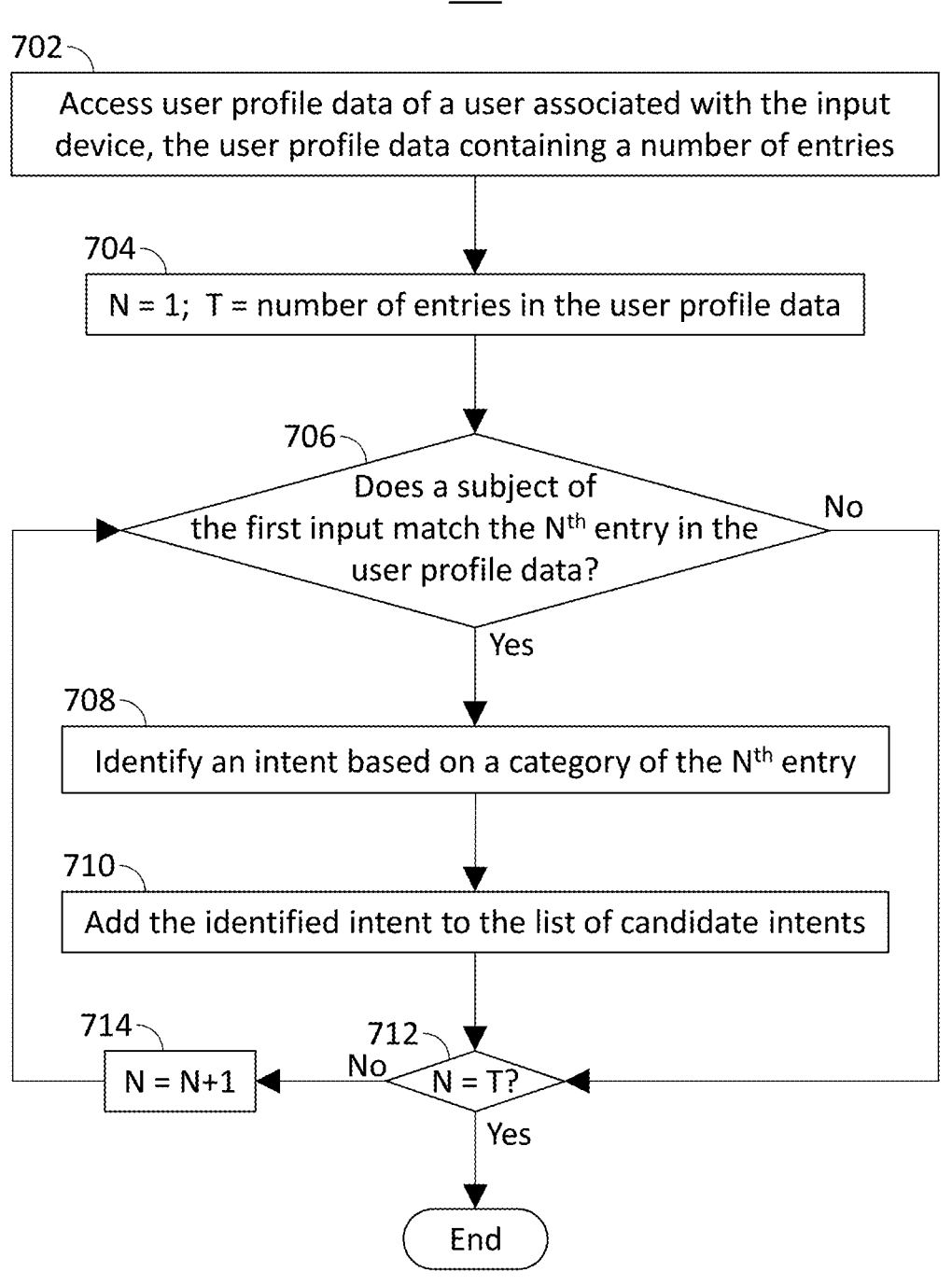

700

702 — Access user profile data of a user associated with the input device, the user profile data containing a number of entries 704 — N = 1;  T = number of entries in the user profile data 706 — Does a subject of the first input match the N$^{th}$ entry in the user profile data?     No Yes 708 — Identify an intent based on a category of the N$^{th}$ entry 710 — Add the identified intent to the list of candidate intents 714 — N = N+1     712 — No     N = T?

Yes

End

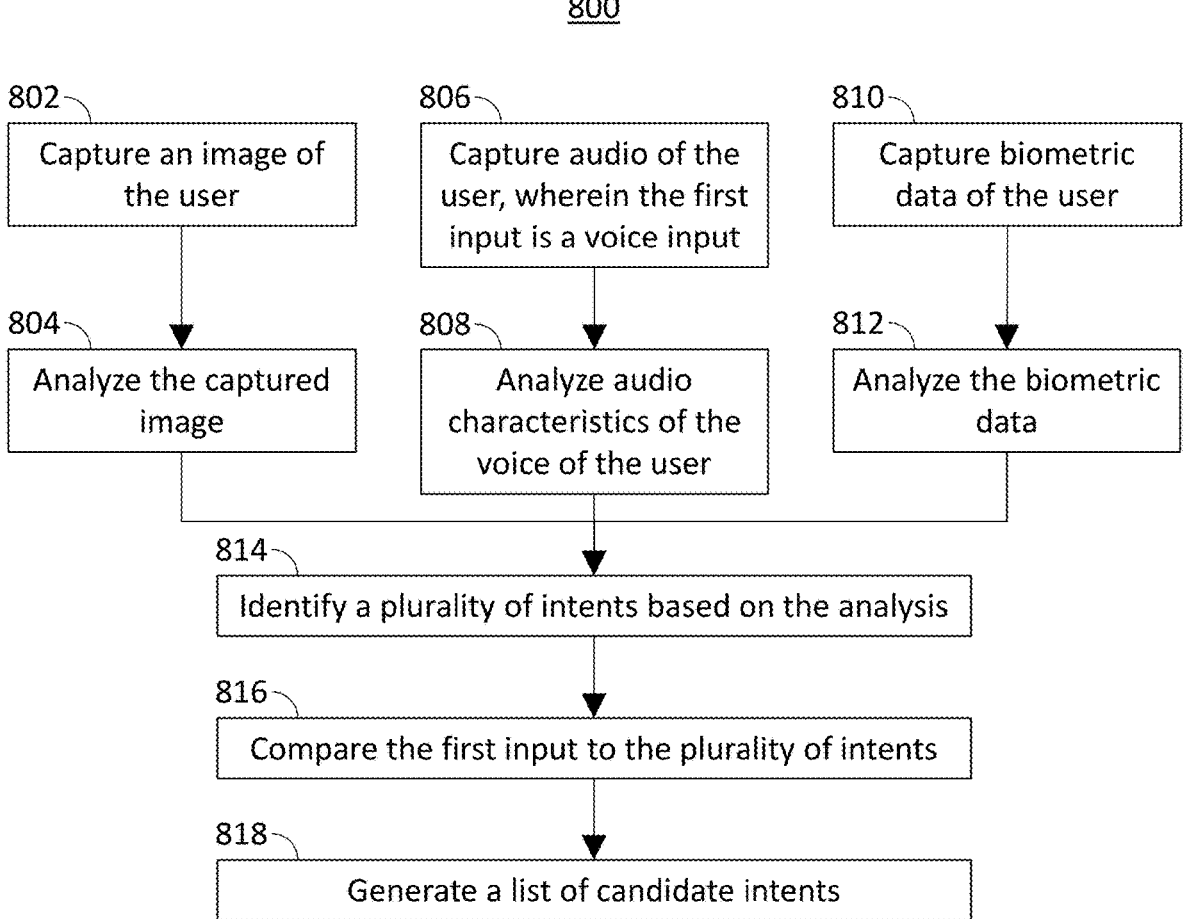

802 — Capture an image of the user

804 — Analyze the captured image

806 — Capture audio of the user, wherein the first input is a voice input

808 — Analyze audio characteristics of the voice of the user

810 — Capture biometric data of the user

812 — Analyze the biometric data

814 — Identify a plurality of intents based on the analysis

816 — Compare the first input to the plurality of intents

818 — Generate a list of candidate intents

FIG. 8

SYSTEMS AND METHODS FOR MULTI-AGENT CONVERSATIONS

BACKGROUND

This disclosure is directed to automated chat systems, such as personal assistant systems. In particular, techniques are disclosed for initializing multiple chat agents to interact with a user to determine the intent of the user.

SUMMARY

Interactive virtual agents, such as personal assistants (e.g., Siri, Google Home, Amazon Alexa) and customer service chatbots, are commonly used to accomplish tasks or retrieve information. In general, these virtual agents respond to a user input in one of two ways. First, the virtual agent may look for a keyword and/or command phrase in an input and perform a related action. For example, in response to the question "What is weather today?" a virtual personal assistant may retrieve and output current weather conditions. However, inputs that do not contains a known keyword or command phrase usually result in an error message or request for additional input. Second, the virtual agent may have pre-scripted responses designed to identify a user's intent through a series of progressively narrower inquiries. These types of response are most often used by virtual customer service chatbots and often ignore any keywords or other information contained in the user's initial input. What is needed, therefore, is a system that evaluates not only keywords and command phrases, but also the intent of the user.

Systems and methods are described herein for a multi-agent conversation in which several virtual agents are initialized, each agent corresponding to a candidate intent of the user. A first input is received from a user input device. For example, the input may be received as text from a physical keyboard or virtual keyboard (such as on a smartphone) or may be received as audio using a microphone. Based on the first input, a list of candidate intents is generated, and a plurality of agents is initialized. Each agent of the plurality of agents corresponds to a respective candidate intent. Each agent then provides a response to the first input. Since each agent corresponds to a different intent, each gives a different response. A second input is then received that responds to one or more of the agents. Based on the agents to which the second input is responsive, the list of candidate intents is refined and, based on the refined list, one or more agents are deactivated.

The list of candidate intents may be generated in a variety of ways. For example, user profile data may be accessed and compared with the first input to identify one or more intents. As another example, biometric sensors and/or image sensors can be used to ascertain the mental state of the user. By comparing the mental state of the user with the first input, candidate intents can be identified. In embodiments in which the inputs are voice inputs, audio analysis of the voice of the user may be used to determine one or more intents. Similarly, in embodiments in which the inputs are captured using a video capture device, visual characteristics of the user, including posture, gestures, facial expressions, and the like, may be analyzed to determine one or more intents.

In cases where the first input is too broad, the list of candidate intents may be too large. If the list of candidate intents contains more than a threshold number of candidate intents, no agents may be initialized until a second input is received that narrows the list of candidate intents to below the threshold number of candidate intents. In some embodiments, a prompt may be generated for the user to provide a second input.

In some embodiments, the number of times an input is responsive to each agent is tracked. If consecutive inputs are responsive to a given agent more than a threshold number of times, all other agents may be deactivated.

The plurality of virtual agents may be presented in a group chat environment. For example, responses from each agent may be displayed in a text-based chat application. As another example, an audio chat environment such as a simulated phone call may be used, wherein responses from each agent are synthesized into speech with a different voice being used for each agent. A third example is a video chat application, where an avatar of each agent is displayed.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is a flowchart representing a process for identifying candidate intents based on user profile data, in accordance with some embodiments of the disclosure;

FIG. 8 is a flowchart representing a process for identifying candidate intents based on audio, visual, or biometric characteristics of the user, in accordance with some embodiments of the disclosure.

DETAILED DESCRIPTION

Figure 1:
FIG. 1 shows initialization of an exemplary multi-agent conversation, in accordance with some embodiments of the disclosure.

FIGS. 1-4 show an exemplary multi-agent conversation, in accordance with some embodiments of the disclosure. As show in FIG. 1, the multi-agent conversation is displayed in a text-based chat application on device 100. Input 102 "It's a nice day out, but I want to go back to sleep" is received from user U1. Input 102 may have been entered as text using a keyboard or as voice using a microphone. Input 102 contains no direct commands or keywords, so the user's intent cannot yet be determined. Instead, several candidate intents are identified based on the content of input 102. Input 102 contains a positive sentiment in the clause "It's a nice day out" and a statement "I want to go back to sleep" joined by the conjunction "but." Based on these features, for example, user U1 may be trying to determine why they are tired. As another example, user U1 may be trying to become more awake. As a third example, user profile data may indicate that user U1 always checks the weather in the morning and thus the user may intend to ask about the weather. In a fourth example, user profile data may indicate that the user eats certain types of food when they are tired. Thus, the user's intent may be related to food. Agents A1-A4 are initialized based on the list of candidate intents identified from input 102. Each agent corresponds to a different candidate intent. Agent A1, corresponding to the candidate intent of asking about the weather, gives reply 104a "Yes, it is a nice day. I feel the same way." Agent A2, corresponding to the candidate intent of trying to become more awake, gives reply 104b "Yes, but let's play some games together." Agent A3, corresponding to the candidate intent of trying to determine why the user is tired, gives reply 104c "I don't think the weather is that good. Why do you feel tired?" Agent A4, corresponding to the food related intent, gives reply 104d "Indeed, yes! I'm in the mood for some spicy food." Each of replies 104a-104d provides user U1 with a different reply, each from a different perspective. As the user provide additional input in response, the agents to which the additional inputs are responsive continue to reply while other agents are deactivated.

Figure 2:
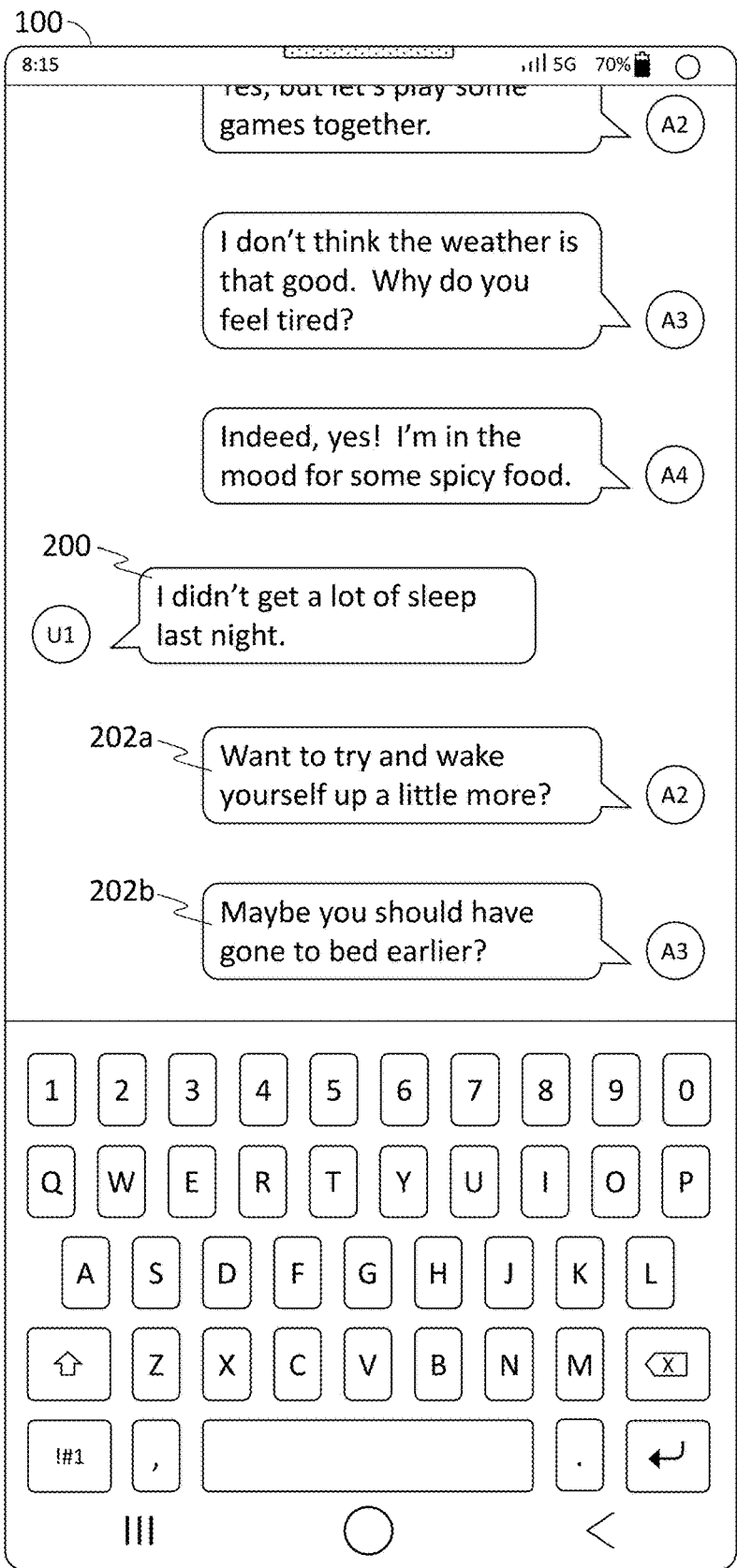
FIGS. 2-4 show a progression of the exemplary multi-agent conversation of FIG. 1, in accordance with some embodiments of the disclosure.
Figure 3:
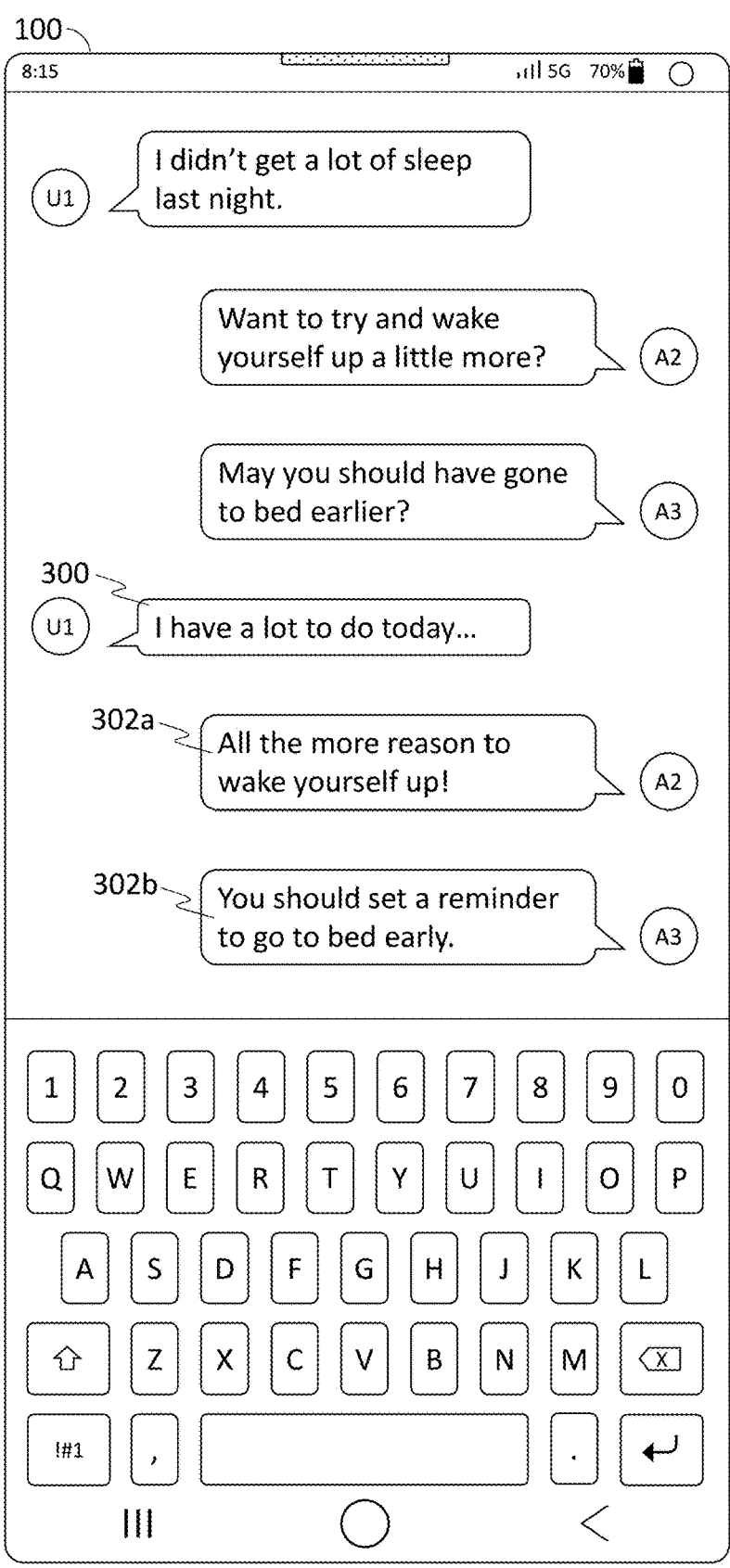
Figure 4:
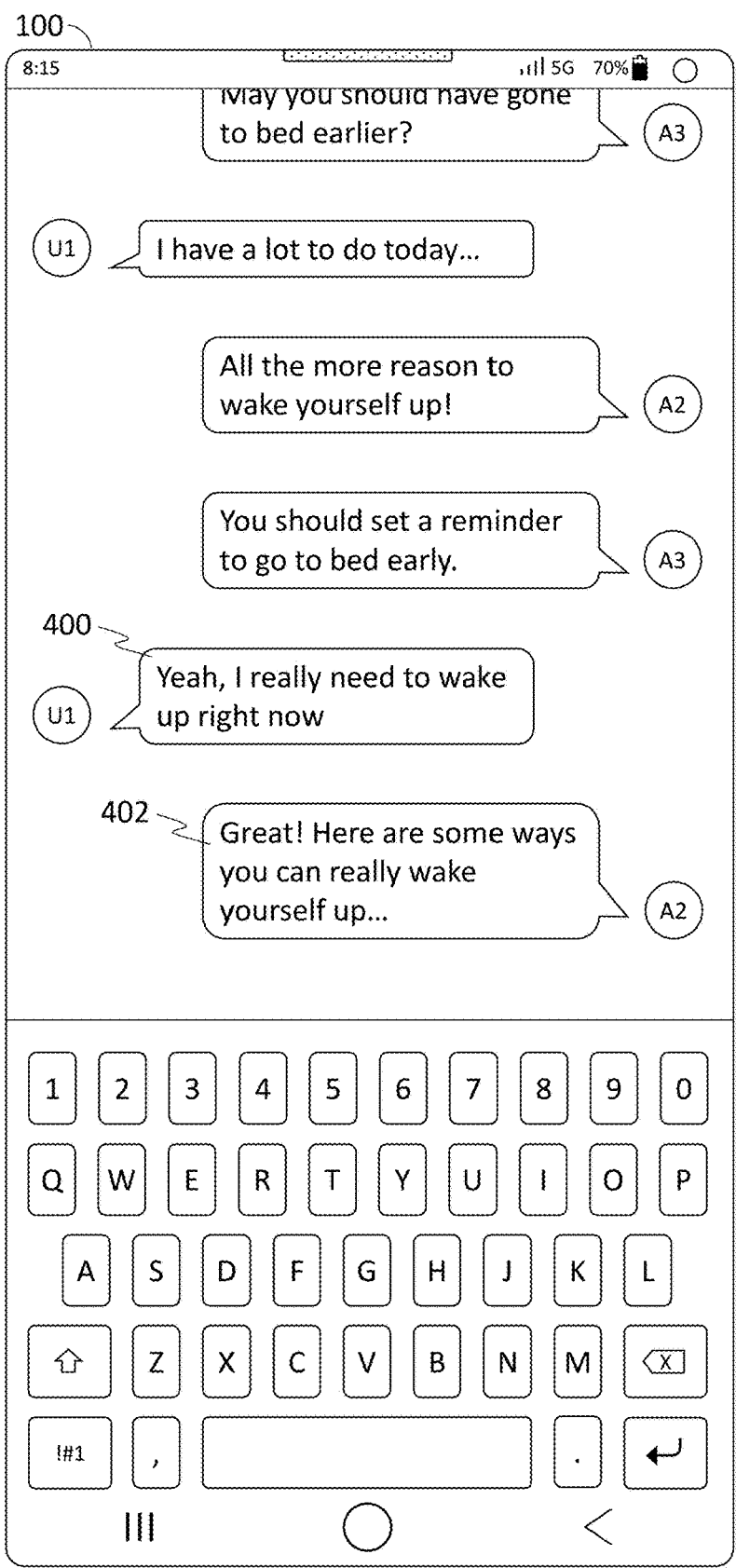

FIG. 2 shows a continuation of the multi-agent conversation of FIG. 1 in which input 200 is received from user U1. Input 200 "I didn't get a lot of sleep last night" is analyzed to determine to which of the active agents A1-A4 it may be responsive. Agents A2 and A3 correspond to the candidate intents related to tiredness, so input 200 is determined to be responsive to replies 104b and 104c given by agents A2 and A3, respectively. Accordingly, agent A2 provides reply 202a "Want to try and wake yourself up a little more?" and agent A3 provides reply 202b "Maybe you should have gone to bed earlier?" Since input 200 is not responsive to reply 104a or reply 104d, agents A1 and A4 are deactivated. FIG. 3 shows a further continuation of this multi-agent conversation in which input 300 "I have a lot to do today . . . " is received from user U1. Input 300 is analyzed and determined to again be responsive to both replies 202a and 202b. Therefore, agents A2 and A3 both provide further replies 302a "All the more reason to wake yourself up!" and 302b "You should set a reminder to go to bed early," respectively. At this point, both agents A2 and A3 remain active. FIG. 4 shows a final continuation of this multi-agent conversation in which input 400 "Yeah, I really need to wake up right now" is received from user U1. Input 400 is determined to be responsive only to reply 302a provided by agent A2. Agent A3 is therefore deactivated, leaving only agent A2 to provide a response that aligns with the intent of user U1, which is to wake up. Agent A2 then replies with reply 402 "Great! Here are some ways you can really wake yourself up . . . " Agent A2 may further provide suggested methods of waking up, increasing energy and/or alertness, or the like. These suggestions may be provided directly by agent A2, or agent A2 may provide links to resources for user U1 to access at their convenience. If the multi-agent conversation is in the form of a text-based chat such as that shown in FIGS. 1-4, such links may be provided as hyperlinks within an additional reply or replies from agent A2. If the multi-agent conversation is in the form of a voice or video conversation, agent A2 may send the links to user U1 via SMS message, MMS message, email, or other messaging service.

Figure 5:
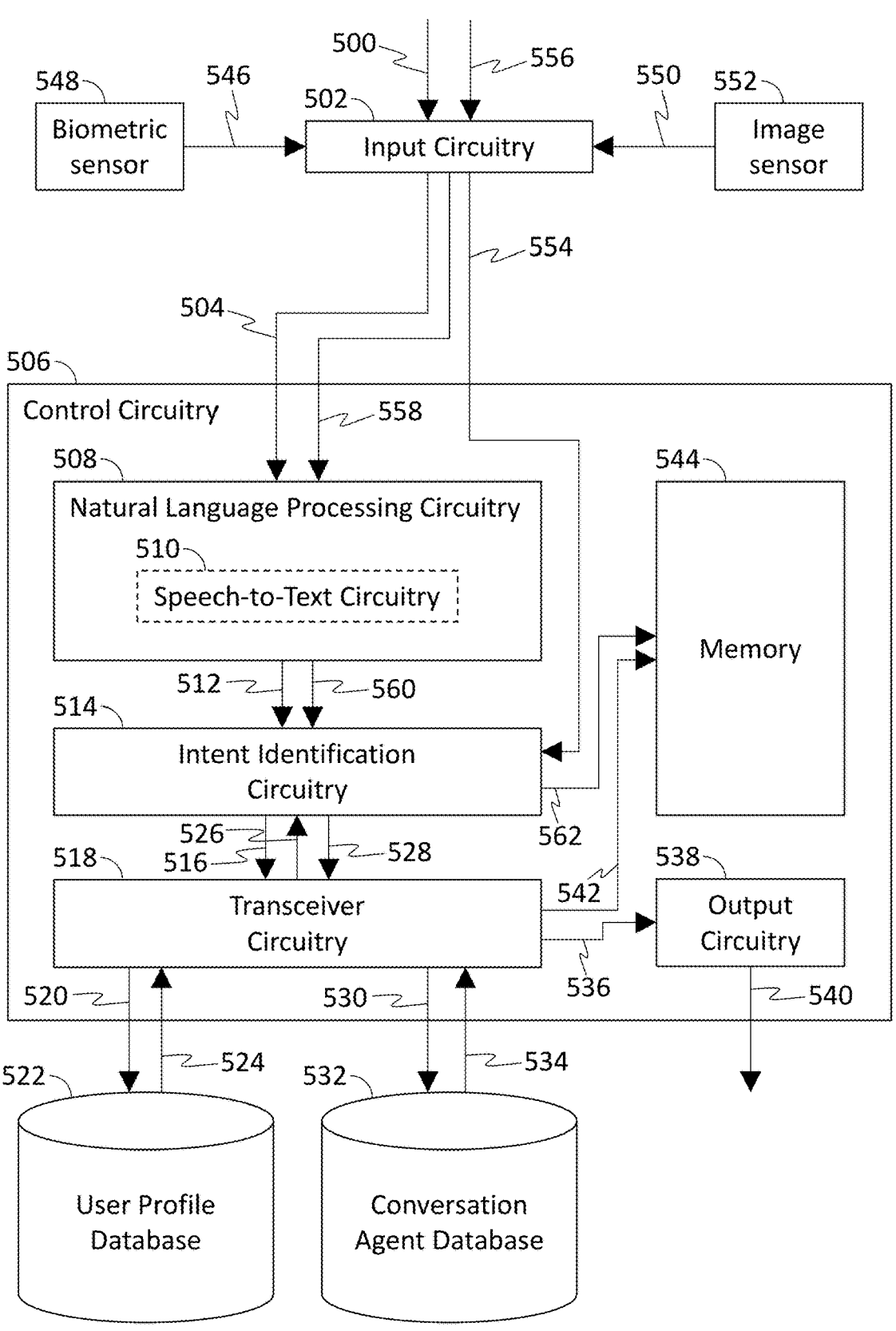
FIG. 5 is a block diagram showing components and data flow therebetween of a system for multi-agent conversations, in accordance with some embodiments of the disclosure.

FIG. 5 is a block diagram showing components and data flow therebetween of a system for multi-agent conversations, in accordance with some embodiments of the disclosure. A first input (e.g., input 102) is received 500 using input circuitry 502. Input circuitry 502 may be a physical keyboard into which a user types the input. Alternatively, input circuitry may include a microphone through which input is captured as audio data. Input circuitry 502 transmits 504 the input to control circuitry 506 where it is received using natural language processing circuitry 508. In some embodiments, input circuitry may be incorporated into control circuitry 506. Control circuitry 506 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Natural language processing circuitry 508 may include speech-to-text circuitry 510, which transcribes an audio input into corresponding text for further processing by natural language processing circuitry 508.

Natural language processing circuitry 508 identifies various linguistic features of the first input, including parts of speech, phrases, idioms, and the like. Natural language processing circuitry 508 may generate a data structure representing the linguistic features of the first input, and may further store the linguistic features of the first input for later use in determining linguistic features of subsequent inputs.

Natural language processing circuitry 508 transmits 512 the linguistic features of the first input to intent identification circuitry 514. Intent identification circuitry 514 analyzes the linguistic features of the first input to try to determine what intent the user had when entering the first input. For example, input 102 of FIG. 1, "It's a nice day out, but I want to go back to sleep." contains no obvious keywords or command phrases, and consists of two seemingly unrelated clauses. The first clause "It's a nice day out" refers to the weather. Intent identification circuitry 514 may identify the weather as a candidate intent for the input. The second clause "I want to go back to sleep" is a statement about the user's physical state and relates to sleep or, more generally, tiredness. Intent identification circuitry 514 may identify sleep as another candidate intent for the input. The two clauses are separated by the conjunction "but" indicating a juxtaposition being made by the user in the input. However, it is unclear whether the user's intent was related to the weather or to being tired. Furthermore, because of the juxtaposition, the user may be trying to determine why they feel tired despite the nice weather. Intent identification circuitry 514 may therefore identify a desire to understand why the user feels tired as a candidate intent.

Intent identification circuitry 514 may also consider additional information, such as user profile data, in identifying candidate intents. Intent identification circuitry 514 sends 516 a request for user profile data to transceiver circuitry 518. Transceiver circuitry 518 may be a network connection such as an Ethernet port, WiFi module, or any other data connection suitable for communicating with a remote server. Transceiver circuitry 518 in turn transmits 520 the request to user profile database 522. In response to the request, transceiver circuitry 518 receives 524 user profile data associated with the user and sends 526 the user profile data to intent identification circuitry 514. Intent identification circuitry 514 may determine, for example, based on the user profile data, that the user often eats certain foods when they feel tired. Intent identification circuitry 514 may therefore identify food as a candidate intent for the first input.

Once all candidate intents have been identified, intent identification circuitry 514 sends 528 a list of the candidate intents to transceiver circuitry 518, which in turn transmits 530 the list of candidate intents to conversation agent database 532. Conversation agent database 532 identifies a number of conversation agents to initialize in response to the first input, with one agent corresponding to each of the identified candidate intents. Each initialized agent generates a reply to the first input. Transceiver circuitry 518 then receives 534, from conversation agent database 532, each of the replies generated by the initialized agents. Transceiver circuitry 518 then sends 536 the replies to output circuitry 538 for output 540 to the user. Output circuitry 538 may be a video or audio driver used to generate video output or audio output, respectively. Output circuitry 538 may be physically connected to a screen or speaker for output of video or audio signals, respectively, or may be connected to a screen or speaker through a wired (e.g., Ethernet, USB) or wireless (e.g., WiFi, Bluetooth) connection.

Transceiver circuitry 518 also sends 542 an identifier of each initialized agent to memory 544. Memory 544 may be any device for storing electronic data, such as random-access memory, read-only memory, hard drives, solid state devices, quantum storage devices, or any other suitable fixed or removable storage devices, and/or any combination of the same. Memory 544 may also store variables for tracking user interaction with each initialized agent.

In some embodiments, input circuitry 502 may further receive 546 biometric data about the user from biometric sensor 548, such as a heart rate monitor, blood sugar monitor, pulse oximeter, implanted medical devices such as a pacemaker or cochlear implant, or any other suitable biometric sensor. In some embodiments, input circuitry 502 may receive 550 image or video captured by image sensor 552 showing the user at the time of entry of the first input. Input circuitry 502 transmits 554 the received biometric and/or image data to intent circuitry 514. Intent circuitry 514 may include image processing circuitry (e.g., circuitry for performing facial recognition, emotional recognition, gesture recognition) for processing image or video data. Intent circuitry 514 may compare the biometric data and/or image data with known parameters for a plurality of mental states to help refine (or expand) the list of candidate intents. In some embodiments, biometric sensor 548 and/or image sensor 552 are incorporated into control circuitry 506.

After outputting the replies from each of the initialized agents, input circuitry 502 receives 556 a subsequent input. As with the first input, input circuitry 502 transmits 558 the subsequent input to control circuitry 506 where it is received by natural language processing circuitry 508. Using the same processes described above, natural language processing circuitry processes the subsequent input and transmits 560 linguistic features of the subsequent input to intent identification circuitry 514. As with the first input, intent identification circuitry 514 determines candidate intents for the subsequent input and refines the list of candidate intents first generated based on the first input. Based on the refined list of candidate intents, control circuitry 506 deactivates any initialized agents whose corresponding candidate intents no longer appear on the list of candidate intents. Intent identification circuitry 514 determines to which of the remaining agents the subsequent input is responsive (i.e., which agents correspond to the remaining candidate intents). Intent identification circuitry 514 transmits 562 indications of the agents to which the subsequent intent was responsive to memory 544. Memory 544 updates variable or data structures tracking user interactions with each agent. If the user interacts with any agent a threshold number of times in a row (e.g., at least three consecutive inputs are responsive to an agent), all other agents are deactivated, as the conversation has stabilized with a single agent.

Figure 6:
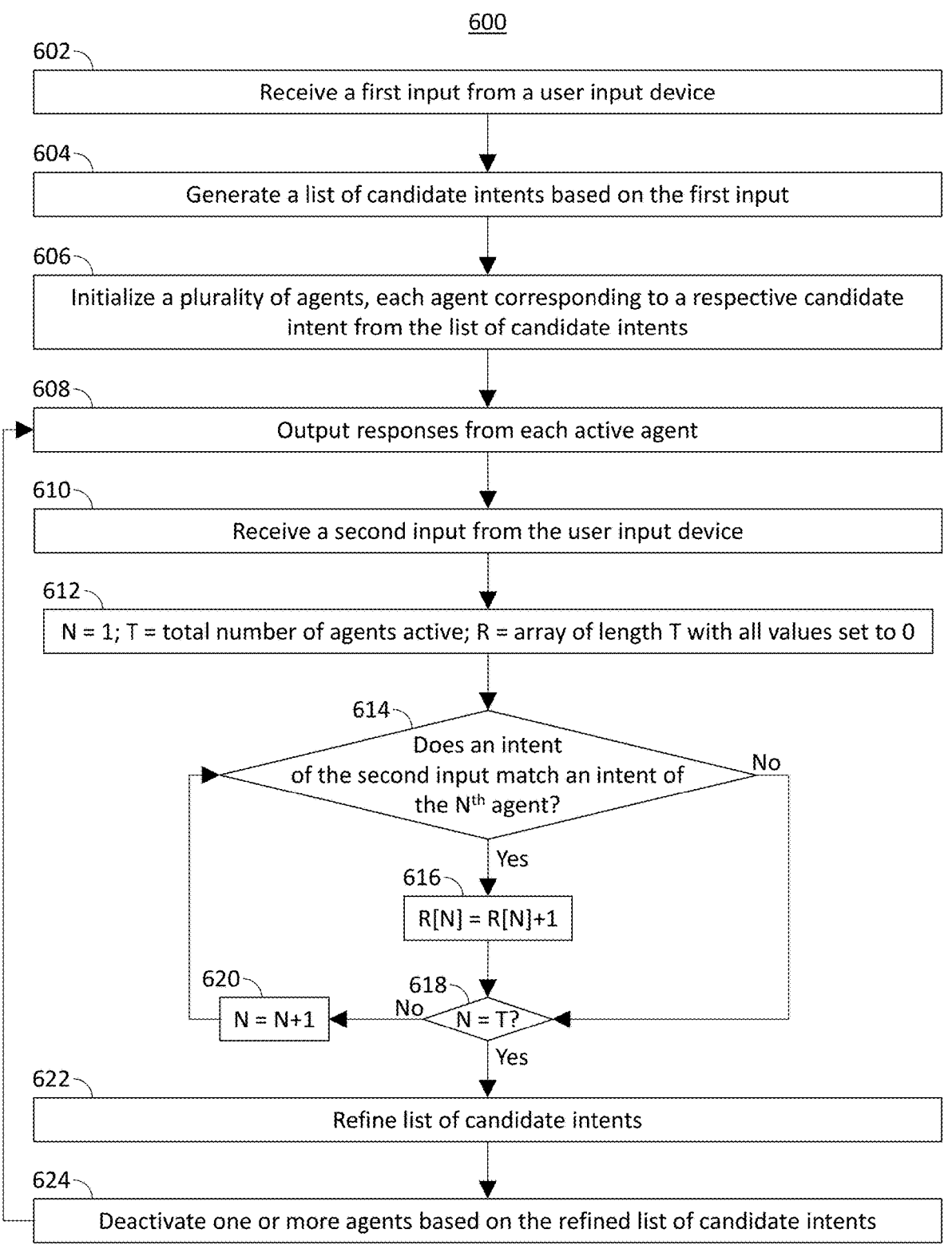
FIG. 6 is a flowchart representing a process for initializing and deactivating a plurality of agents in a multi-agent conversation based on user intent, in accordance with some embodiments of the disclosure.

FIG. 6 is a flowchart representing a process 600 for initializing and deactivating a plurality of agents in a multi-agent conversation based on user intent, in accordance with some embodiments of the disclosure. Process 600 may be implemented on control circuitry 506. In addition, one or more actions of process 600 may be incorporated into or combined with one or more actions of any other process or embodiment described herein.

At 602, control circuitry 506 receives a first input from a user input device. As discussed above, the input may be received as text or audio input. At 604, control circuitry 506, using intent identification circuitry 514, generates a list of candidate intents based on the first input. As discussed above, linguistic features of the first input and, in some embodiments, user profile data, biometric data, user facial expressions or gestures, or any combination thereof, are used to determine a number of potential intents for the first input. For example, based on linguistic features of the first input and user profile data, control circuitry 506 may generate a list of four candidate intents.

At 606, control circuitry 506 initializes a plurality of agents, each agent corresponding to a respective candidate intent from the list of candidate intents. For example, for a list of four candidate intents, control circuitry 506 initializes four agents. Control circuitry may retrieve each agent or an algorithm or data structure for each agent and initialize and run each agent locally. Alternatively, control circuitry 506 may transmit a request to a remote server or database to initialize each of the agents and receive from the remote server or database replies from each agent to each input received from the user. At 608, control circuitry 506, using output circuitry 538, outputs responses from each active agent.

At 610, control circuitry 506 receives a second input from the user input device. As with the first input, at least one candidate intent of the second input is identified. At 612, control circuitry 506 initializes a counter variable N, setting its value to one, a variable T, representing the total number of active agents, and an array or dataset R having length T, with all values set to zero. At 614, control circuitry 506 determines whether an intent of the second input matches an intent of the $N^{th}$ agent. If so ("Yes" at 614), then, at 616, control circuitry increments the value in R corresponding to the $N^{th}$ agent by one. If an intent of the second input does not match an intent of the $N^{th}$ agent ("No" at 614), or after incrementing the value in R corresponding to the $N^{th}$ agent, at 618, control circuitry 506 determines whether N is equal to T. If N is not equal to T, meaning that the intent of the second input has not yet been compared with the intent of every active agent, then, at 620, control circuitry 506 increments the value of N by one and processing returns to 614.

If N is equal to T, meaning that the intent of the second input has been compared with the intent of all active agents ("Yes" at 618) then, at 622, control circuitry 506 refines the list of candidate intents. For example, if a candidate intent that was added to the list of candidate intents based on the first input does not match with an intent of the second input, that candidate intent is removed from the list of candidate intents. At 624, control circuitry 506 deactivates one or more agents based on the refined list of candidate intents. Thus, any agent whose corresponding intent is no longer represented on the list of candidate intents is deactivated and removed from the multi-agent conversation.

The actions and descriptions of FIG. 6 may be used with any other embodiment of this disclosure. In addition, the actions and descriptions described in relation to FIG. 6 may be done in suitable alternative orders or in parallel to further the purposes of this disclosure.

FIG. 7 is a flowchart representing an illustrative process 700 for identifying candidate intents based on user profile data, in accordance with some embodiments of the disclosure. Process 700 may be implemented on control circuitry 506. In addition, one or more actions of process 700 may be incorporated into or combined with one or more actions of any other process or embodiment described herein.

At 702, control circuitry 506 accesses user profile data of a user associated with the user input device. The user profile data may contain a number of entries, and may include calendar data, likes, dislikes, contacts, social media data, or any other user data. At 704, control circuitry 506 initializes a counter variable N, settings its value to one, and a variable T representing the number of entries in the user profile data. At 706, control circuitry 506 determines whether a subject of the first input matches the $N^{th}$ entry in the user profile data. For example, if the subject of the first input is pizza, control circuitry 506 determines whether the $N^{th}$ entry in the user profile data is about pizza. If the subject of the first input matches the $N^{th}$ entry in the user profile data ("Yes" at 706), then, at 708, control circuitry 506 identifies an intent based on a category of the $N^{th}$ entry and, at 710, adds the identified intent to the list of candidate intents.

At 712, control circuitry 506 determines whether N is equal to T, meaning that the subject of the first input has been compared to every entry in the user profile data. If N is not equal to T ("No" at 712), then, at 714, control circuitry 506 increments the value of N by one and processing returns to 706. If N is equal to T ("Yes" at 712), then the process ends.

The actions and descriptions of FIG. 7 may be used with any other embodiment of this disclosure. In addition, the actions and descriptions described in relation to FIG. 7 may be done in suitable alternative orders or in parallel to further the purposes of this disclosure.

FIG. 8 is a flowchart representing a first illustrative process 800 for identifying candidate intents based on audio, visual, or biometric characteristics of the user, in accordance with some embodiments of the disclosure. Process 800 may be implemented on control circuitry 506. In addition, one or more actions of process 800 may be incorporated into or combined with one or more actions of any other process or embodiment described herein.

In some embodiments, at 802, control circuitry 506, using image sensor 552, captures an image of the user. The captured image may be a still image or a video. At 804, control circuitry 506 analyzes the captured image. For example, facial recognition may be performed on a still image or on one or more frames of a video to determine the position and expression of different facial features. The image or video may also include gestures or other movements of the user that can be identified and can aid in determining the mental state of the user. For example, the user may be smiling and raising their hands up in celebration or may be crying and holding their head. These expressions and gestures are identified by control circuitry 506 and used to determine the mental state of the user.

In other embodiments, at 806, control circuitry 506 captures audio of the user, wherein the first input is a voice input. At 808, control circuitry 506 analyzes audio characteristics of the voice of the user. For example, control circuitry 506 may analyze the tone, inflection, accent, timbre, and other characteristics of the voice of the user, as well as the speed with which the user speaks. Control circuitry 506 may compare these characteristics with known baseline characteristics of the voice of the user to determine how the user is speaking. For example, if the user is excited then the tone of the user's voice may be higher than normal, and the user may speak more quickly, while if the user is upset, the tone of the user's voice may be lower and the user may speak more slowly. If the user is crying, there may be pauses in between words or variations in tone of the user's voice.

In yet other embodiments, at 810, control circuitry 506 may capture biometric data of the user. For example, control circuitry 506 may receive data from a wearable, remote, or implanted biometric device, such as a heart rate monitor, pulse oximeter, blood sugar monitor, blood pressure monitor, infrared thermometer, pacemaker, cochlear implant, or any other biometric sensor device. At 812, control circuitry 506 analyzes the biometric data. For example, if the user is excited, the user's heart rate will increase. Control circuitry 506 may access user profile data and compare the user's heart rate with a known resting heart rate of the user to determine if the user's heart rate is elevated. Similar comparisons can be made for other biometric data.

At 814, based on analysis of one or more of the captured data (i.e., image data, audio data, and/or biometric data), control circuitry 506 identifies a plurality of intents and, at 816, compares the plurality of intents with the first input. For example, in identifying candidate intents for input 102, control circuitry 506 may receive biometric data indicating that the user has low blood sugar. Control circuitry 506 may determine that the user may be tired because of this condition and identify as a candidate intent a need for medical assistance. At 818, control circuitry 506 generates a list of candidate intents, including not only candidate intents identified based on the text of the first input, but also candidate intents identified based on the captured image, audio, and/or biometric data.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
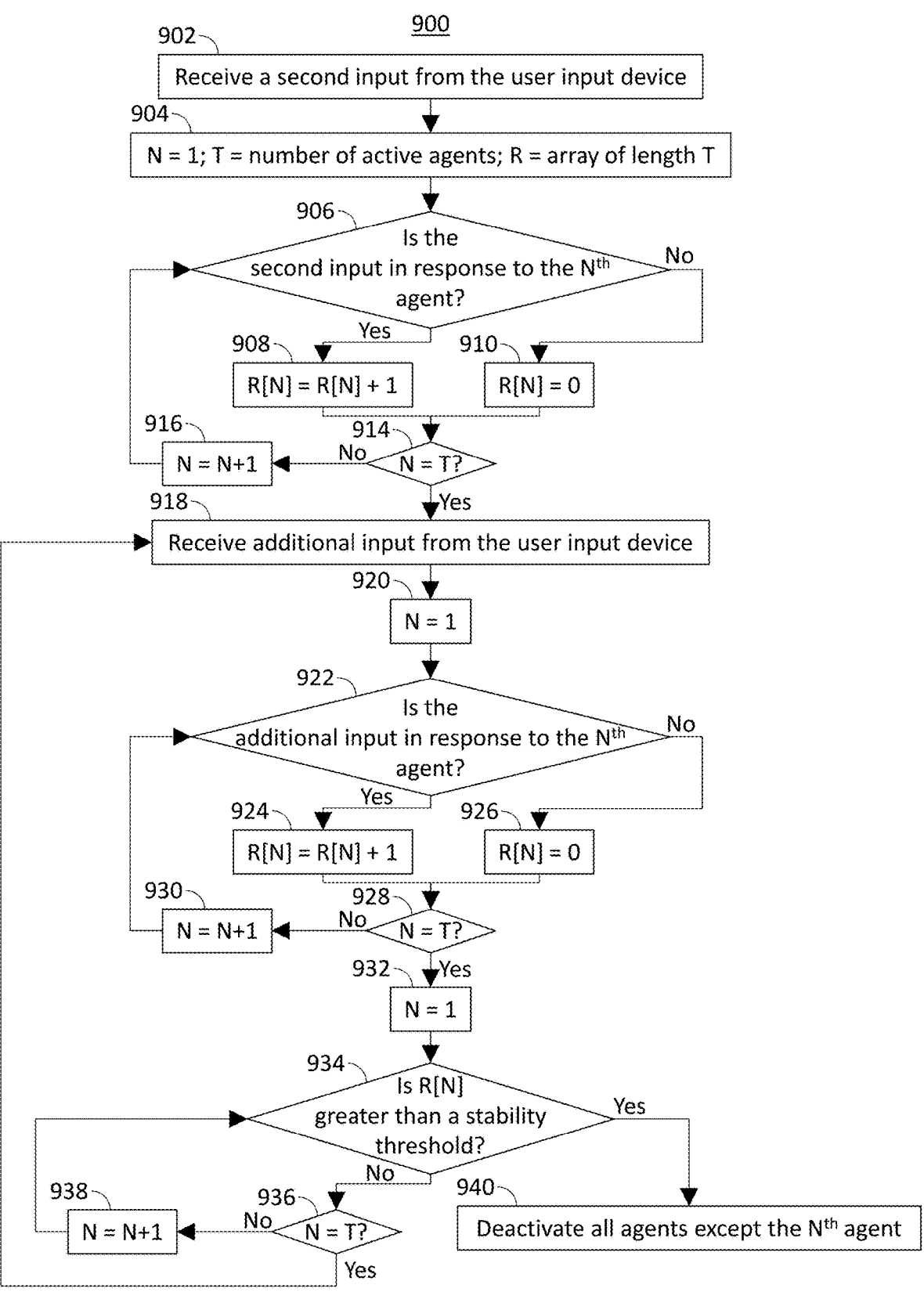
FIG. 9 is a flowchart representing a process for tracking user responses to each agent in a multi-agent conversation, in accordance with some embodiments of the disclosure.

FIG. 9 is a flowchart representing a second illustrative process 900 for tracking user responses to each agent in a multi-agent conversation, in accordance with some embodiments of the disclosure. Process 900 may be implemented on control circuitry 506. In addition, one or more actions of process 900 may be incorporated into or combined with one or more actions of any other process or embodiment described herein.

At 902, control circuitry 506 receives a second input from the user input device. The second input is received in response to one or more replies from the plurality of initialized agents. At 904, control circuitry 506 initializes a counter variable N, setting its value to one, a variable T representing the number of active agents, and an array or dataset R having a length T. Each of the values in R may initially be set to zero. At 906, control circuitry 506 determines whether the second input is in response to the $N^{th}$ agent. For example, the second input may be determined to have an intent that matches the intent to which the $N^{th}$ agent corresponds. If the second input is in response to the $N^{th}$ agent ("Yes" at 906), then, at 908, control circuitry 506 increments the value in R corresponding to the $N^{th}$ agent by one. Otherwise ("No" at 906), control circuitry 506 sets, or resets, the value in R corresponding to the $N^{th}$ agent to zero.

Then, at 914, control circuitry 506 determines whether N is equal to T, meaning that the second input has been compared with all active agents. If N is not equal to T ("No" at 914), meaning that there are additional agents with which the second input is to be compared, then, at 916, control circuitry 506 increments the value of N by one and processing returns to 906. If N is equal to T ("Yes" at 914), then processing moves to 918, where additional input is received from the user input device.

At 920, control circuitry 506 resets the value of N to one. At 922, control circuitry 506 determines whether the additional input is in response to the $N^{th}$ agent, similar to the determination made at 906 regarding the second input. If the additional input is in response to the $N^{th}$ agent ("Yes" at 922), then, at 924, control circuitry 506 increments the value in R corresponding to the $N^{th}$ agent by one. Otherwise ("No" at 922), then, at 926, control circuitry 506 resets the value in R corresponding to the $N^{th}$ agent to zero. Then, at 928, control circuitry 506 determines whether N is equal to T, meaning that additional input has been compared with all active agents. If N is not equal to T ("No" at 928), meaning that there are additional agents with which the additional input is to be compared, then, at 930, control circuitry 506 increments the value of N by one and processing returns to 922.

If N is equal to T ("Yes" at 928), then, at 932, control circuitry 506 resets the value of N to one. At 934, control circuitry 506 determines whether the value in R corresponding to the $N^{th}$ agent is greater than a stability threshold. For example, the conversation may be determined to "stabilize" if three consecutive inputs are responsive to the same agent. For example, four agents may be initialized in response to the first input. A second and third input may both be responsive to the first and second agents, and a fourth input may be responsive to only the second agent. Since three consecutive inputs were responsive to the second agent, the conversation may have stabilized, and the intent of the user identified as the intent to which the second agent corresponds. If the value in R corresponding to the $N^{th}$ agent is not greater than the stability threshold ("No" at 934), then, at 936, control circuitry 506 determines whether N is equal to T, meaning that the value in R corresponding to each active agent has been compared with the stability threshold. If N is not equal to T ("No" at 936), meaning that there are more values in R to compare with the stability threshold, then, at 938, control circuitry 506 increments the value of N by one and processing return to 934.

If N is equal to T ("Yes" at 936) and no values in R have reached the stability threshold, then processing returns to 918, where additional input may be received from the user input device. The actions at 918-938 may be repeated until a value in R is found to exceed the stability threshold. If a value in R does exceed the stability threshold ("Yes" at 934), then, at 940, control circuitry 506 deactivates all agents except the $N^{th}$ agent with which the conversation is determined to have stabilized.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving a first input from a user input device;
generating a list of candidate intents based on the first input;
based on determining that the list of candidate intents includes more than a threshold number of candidate intents:
providing a prompt via the user input device for a second input;
receiving the second input from the user input device;
determining a subset of the list of candidate intents based on the second input;
initializing a plurality of agents, each agent corresponding to a respective candidate intent from the subset of the list of candidate intents and each agent configured to provide a response to the second input;
providing, as output via a user interface of the user input device, a respective response to the second input from each agent of the plurality of agents corresponding to each candidate intent from the subset of the list of candidate intents for the first input;
receiving a third input from the user input device in response to a respective response from at least one of the plurality of agents;
refining, based on the third input, the subset of the list of candidate intents; and
reducing a number of active agents from the plurality of agents to a single active agent by deactivating one or more agents of the plurality of agents based on the refined list of candidate intents.

2. The method of claim 1, further comprising:
accessing user profile data of a user associated with the user input device,
wherein generating the list of candidate intents further comprises comparing the first input with the user profile data.

3. The method of claim 1, further comprising:
detecting, using at least one sensor, a mental state of a user,
wherein generating the list of candidate intents further comprises comparing the first input with the mental state of the user.

4. The method of claim 1, wherein the first input is a voice input, the method further comprising:
analyzing audio characteristics of the voice input,
wherein generating the list of candidate intents further comprises:
determining, based on the audio characteristics, a plurality of intents; and
comparing the first input with the plurality of intents.

5. The method of claim 1, wherein the first input is captured using a video capture device, the method further comprising:
analyzing visual characteristics of a user, wherein generating the list of candidate intents further comprises:

determining, based on the visual characteristics, a plurality of intents; and comparing the first input with the plurality of intents.

6. The method of claim 1, further comprising:

receiving a plurality of subsequent inputs from the user input device; and for each respective agent of the plurality of agents:

tracking a number of consecutive times an input of the plurality of subsequent inputs is in response to the respective agent;

comparing the number to a response stability threshold; and in response to determining, based on the comparing, that the number meets or exceeds the response stability threshold, deactivating all agents of the plurality of agents except for the respective agent.

7. The method of claim 1, further comprising:

generating for output a group chat environment; and generating for output within the group chat environment an indication of each respective agent of the plurality of agents in a conversation environment.

8. The method of claim 1, further comprising:

generating for display a video conference environment; and generating for display within the video conference environment an avatar of each respective agent of the plurality of agents in the video conference environment.

9. A system comprising:

input circuitry configured to receive a first input from a user input device; and control circuitry configured to:

generate a list of candidate intents based on the first input;

based on determining that the list of candidate intents includes more than a threshold number of candidate intents:

provide a prompt via the user input device for a second input;

receive the second input from the user input device;

determine a subset of the list of candidate intents based on the second input;

initialize a plurality of agents, each agent corresponding to a respective candidate intent from the subset of the list of candidate intents and each agent configured to provide a response to the second input;

provide, as output via a user interface of the user input device, a respective response to the second input from each agent of the plurality of agents corresponding to each candidate intent from the subset of the list of candidate intents for the first input;

receive a third input from the user input device in response to a respective response from at least one of the plurality of agents;

refine, based on the third input, the subset of the list of candidate intents; and reduce a number of active agents from the plurality of agents to a single active agent by deactivating one or more agents of the plurality of agents based on the refined list of candidate intents.

10. The system of claim 9, wherein the control circuitry is further configured to:

access user profile data of a user associated with the user input device, wherein the control circuitry that is configured to generate the list of candidate intents is further configured to compare the first input with the user profile data.

11. The system of claim 9, wherein the control circuitry is further configured to:

detect, using at least one sensor, a mental state of a user, wherein the control circuitry that is configured to generate the list of candidate intents is further configured to compare the first input with the mental state of the user.

12. The system of claim 9, wherein the first input is a voice input, and wherein the control circuitry is further configured to:

analyze audio characteristics of the voice input, wherein the control circuitry configured to generate the list of candidate intents is further configured to:

determine, based on the audio characteristics, a plurality of intents; and compare the first input with the plurality of intents.

13. The system of claim 9, wherein the input circuitry comprises a video capture device, and where the control circuitry is further configured to:

analyze visual characteristics of a user, wherein the control circuitry configured to generate the list of candidate intents is further configured to:

determine, based on the visual characteristics, a plurality of intents; and compare the first input with the plurality of intents.

14. The system of claim 11, wherein the control circuitry is further configured to:

receive a plurality of subsequent inputs from the user input device; and for each respective agent of the plurality of agents:

track a number of consecutive times an input of the plurality of subsequent inputs is in response to the respective agent;

compare the number to a response stability threshold; and in response to determining, based on the comparing, that the number meets or exceeds the response stability threshold, deactivate all agents of the plurality of agents except for the respective agent.

15. The system of claim 9, wherein the control circuitry is further configured to:

generate for output a group chat environment; and generate for output within the group chat environment an indication of each respective agent of the plurality of agents in a conversation environment.

16. The system of claim 9, wherein the control circuitry is further configured to:

generate for display a video conference environment; and generate for display within the video conference environment an avatar of each respective agent of the plurality of agents in the video conference environment.

* * * * *